United States Patent
Siol et al.

(10) Patent No.: US 6,214,942 B1
(45) Date of Patent: *Apr. 10, 2001

(54) MULTI-STAGE PROCESS FOR PRODUCING HEAT RESISTANT DIMENSIONALLY STABLE POLYMETHACRYLATE MOULDING COMPOUNDS

(75) Inventors: Werner Siol, Darmstadt; Heinz Vetter, Rossdorf; Michael Wicker, Seeheim-Jugenheim, all of (DE)

(73) Assignee: Roehm GmbH, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,026

(22) PCT Filed: Feb. 25, 1997

(86) PCT No.: PCT/EP97/00884

§ 371 Date: Sep. 14, 1998

§ 102(e) Date: Sep. 14, 1998

(87) PCT Pub. No.: WO97/33925

PCT Pub. Date: Sep. 18, 1997

(30) Foreign Application Priority Data

Mar. 13, 1996 (DE) ............................................. 196 09 715

(51) Int. Cl.$^7$ ................................. C08F 2/38; C08F 6/00; C08F 20/14

(52) U.S. Cl. ................................. 526/65; 526/73; 526/88; 526/328; 526/329.7; 528/501

(58) Field of Search ................................. 526/65, 73, 88, 526/328, 329.7; 528/501

(56) References Cited

U.S. PATENT DOCUMENTS 3,252,950 * 5/1966 Terenzi et al. ............................ 526/65
4,933,400 * 6/1990 Jarvis et al. ............................ 526/65

FOREIGN PATENT DOCUMENTS 1013688 12/1965 (GB) .
59-210911 11/1984 (JP) .

* cited by examiner

Primary Examiner—Fred Teskin
(74) Attorney, Agent, or Firm—Oblon, Spivak, McClelland, Maier & Neustadt, P.C.

(57) ABSTRACT

The invention concerns a process for producing polymethacrylate moulding compounds, which have high thermal dimensional stability and high stability with respect to thermal decomposition, by the radical polymerization of methylmethacrylate monomers and optionally comonomers in at least two reactors operated successively, ensuring a high degree of blending. The process is characterized in that: a) a first reactor is operated at a temperature of less than 120° C.; and b) a second reactor or further successive reactors is/are operated in a temperature range of more than 130° C. and at most 200° C.

20 Claims, No Drawings

MULTI-STAGE PROCESS FOR PRODUCING HEAT RESISTANT DIMENSIONALLY STABLE POLYMETHACRYLATE MOULDING COMPOUNDS

DESCRIPTION

1. Field of the Invention

The invention relates to a process for synthesis of polymethacrylate molding compounds with high deflection temperature under load and high thermal stability, wherein polymerization takes place below 120° C. in a first reactor stage and a second or further reactor stage or stages is or are operated in a temperature range of between 130 and 200° C. Residual monomers separated in a subsequent devolatilization stage can be recycled to the process. At the same time, the molding compound can be discharged.

2. Prior Art

Polymethacrylate molding compounds are usually synthesized by batchwise or continuous substance polymerization or by bead polymerization. The batch process, which is performed at low temperatures, for example between 20 and 50° C., is very time-consuming and labor-intensive, and so in recent years it has been progressively and almost completely superseded by continuous, albeit technically complex polymerization processes.

Continuous polymerization is performed, for example, in a zone in which the temperature increases from 130 to 250° C. in a polymerization system designed as an extruder. Before isolation of the polymerized product as extrudate, the unreacted monomer, which can represent as much as 40 wt % of the feed monomers, is removed in a devolatilization zone and recycled to polymerization.

To achieve high yields per unit volume and time, the polymerization is usually performed at temperatures of around 100° C. and in the presence of relatively high initiator concentrations (see, for example, Vieweg, Esser, Kunststoff-Handbuch [Plastics Handbook], Volume IX, pages 22 to 35, Carl Hanser Verlag, Munich, 1975 or Ullmanns Enzyklopädie der technischen Chemie [Encyclopedia of Industrial Chemistry], 4th Edition, Volume 19, pages 22 to 27, Verlag Chemie, Weinheim, 1980). The synthesis of polymethacrylate molding compounds by solution polymerization and subsequent evaporation of the solvent is also known.

In general, the methacrylate is copolymerized with a few per cent of an acrylic acid ester or with styrene to impart thermal stability to the polymethacrylate molding compounds.

Polymerization processes for the synthesis of thermoplastically processable polymethacrylate molding compounds are generally performed in the presence of transfer regulators, especially in the presence of mercaptans, which act as chain-termination regulators in the polymerization mechanism and thus influence the degree of polymerization and the chemical structure of the polymer end groups. With the mercaptans, which are the best known regulators, polymerized products are generally obtained that have a higher number of thermally more stable end groups than do polymethacrylates synthesized without regulators (see, for example, German Patent 1645232). The nature of the end group is of particular importance for the thermal stability of polymethacrylate molding compounds.

For example, it was shown in model experiments that polymethyl methacrylate polymer chains with saturated end groups as formed by transfer reactions are stable up to temperatures of higher than 300° C., whereas polymer chains terminated by disproportionation reactions and consequently having an olefinic double bond at the chains end already undergo thermal decomposition at about 250° C. [P. Cacioli et al., Polymer Bulletin 11, 325 (1984)]. Polymethyl methacrylate (PMMA) polymer chains terminated by recombination reactions are thermally stable only up to about 190° C.

To achieve satisfactory thermal stabilization, the incorporation of acrylic acid esters is advantageously combined with polymerization in the presence of mercaptans for industrial processes for synthesis of polymethacrylate molding compounds, while low molecular weight stabilizers are also added for better processing.

The deflection temperature under load of polymethacrylate molding compounds, which can be defined, for example, by the glass transition temperature Tg or the Vicat softening temperature VST per ISO 306, is decisively influenced by the tacticity of the polymethacrylate polymer chains, a parameter that can be varied within wide limits as a function of the polymerization process. For industrial purposes, high proportions of syndiotactic and heterotactic triads are desired, since they lead to molding compounds with high deflection temperature under load. In contrast, high proportions of isotactic triads in the polymer chains are not desired, because they act against high deflection temperature under load.

At low polymerization temperatures, mainly the desired syndiotactic triads are obtained in the polymer chains, but relatively high initiator concentrations must be used in such polymerization processes in order to achieve high yields per unit volume and time. Thereby there are increasingly formed polymer chains which, as already explained, are terminated by recombination reactions or disproportionation reactions and thus have poorer thermal stability. On the other hand, by polymerization at elevated temperatures, for example in a continuous polymerization process at about 180° C., good yields per unit volume and time of polymers with good thermal stability are already achieved with relatively low initiator concentrations. At these high polymerization temperatures, however, the polymerized product obtained has poor deflection temperature under load, due to high proportions of isotactic triads.

European Patent 245647 (=U.S. Pat. No. 4,877,853) teaches a technical method for overcoming this problem. Therein there is described a thermoplastically processable polyacrylate molding compound with simultaneously high deflection temperature under load and high thermal stability, wherein the content of syndiotactic triads is higher than 60% and the initiator/regulator ratio is preferably at most 1:2 or most preferably much lower, and wherein the polymethacrylate molding compound is synthesized at temperatures of between 0 and 100° C. by emulsion polymerization.

Continuous polymerization processes operating with relatively low conversions and high polymerization temperatures but good yields per unit volume and time are illustrated, for example, in Japanese Kokai Tokkyo Koho JP 04146903, wherein there are described the polymerization of methyl methacrylate up to conversions of 20 to 50%, the subsequent monomer devolatilization as well as the final polymerization of the polymer syrup to polymethyl methacrylate plates with good optical characteristics.

U.S. Pat. No. 2,974,125 relates to the synthesis of copolymerized products of methyl methacrylate, styrene and acrylonitrile, wherein the polymerization is performed at temperatures of between 130 and 155° C. up to conversions of between 10 and 50%. The unreacted monomers are preferably removed by devolatilization and the resulting polymerized products are characterized by high values of percentage elongation under load.

German Accepted Application 2504417 describes a process for synthesis of methyl methacrylate polymerized products containing at least 80 wt % of methyl methacrylate units, the monomers being reacted at temperatures of between 150 and 180° C. to a degree of conversion of about 50 to 80% in the agitating reactor and the unreacted monomers being removed by application of vacuum. The resulting polymerized products are largely free of residual monomers and oligomers up to a molecular weight of 1000 Dalton.

U.S. Pat. No. 4,711,938 relates to a continuous process for synthesis of polymethyl methacrylate or methyl-methacrylate-containing copolymerized products at polymerization temperatures of 140 to 170° C. and conversions of up to 50%, the residual monomers also being removed by application of a vacuum. The resulting polymerized products are characterized by high optical purity and narrow molecular weight distribution.

U.S. Pat. No. 3,637,545 describes the synthesis of polymethyl methacrylate by means of continuous bulk polymerization at temperatures of between 145 and 165 20 C. and conversions of between 40 and 60%. Once again the residual monomers are removed by devolatilization, although in a further embodiment of the invention elastomer particles may be present during the reaction.

European Patent 0319622 B1 describes a process for continuous solution polymerization of (meth)acrylic acid esters comprising the following steps: (a) addition of monomers, polymerization aids and solvents in such a way that the polymer content of the reaction mixture remains under 50 wt %, (b) reaction temperatures of 60 to 130° C. and sufficient residence times to ensure 20 to 95% conversion of the monomers, (c) transfer of the polymerized product to another polymerization reactor for (d) subsequent polymerization at reaction temperatures of between 60 and 130° C., (e) transfer of the raw polymerized product obtained in (d) to a final polymerization reactor in which the non-polymerized constituents of the reaction mixture are removed by flash-devolatilization, as well as (f) special treatment of the final polymerized product.

European Patent 656374 describes a preferably batch process for synthesis of polymethacrylate molding compounds with high deflection temperature under load and high thermal stability, wherein at least 70% of the molding compound is synthesized at a monomer concentration of more than 5 mol of methacrylate per liter of reaction mixture. Monomer conversions of about 40 to 50% are achieved in this process.

OBJECT AND ACHIEVEMENT

The synthesis of polymethacrylate molding compounds with high deflection temperature under load and high thermal stability is largely achieved in principle by European Patent 656374. From the industrial viewpoint, however, it would also be desirable to achieve a continuous process with even higher degrees of conversion, in which polymethacrylate molding compounds with comparably high deflection temperature under load and thermal stability can be obtained.

The object is therefore to develop an appropriately improved process. The object was achieved by a process for synthesis of polymethacrylate molding compounds with high deflection temperature under load and with high thermal stability, said process comprising radical polymerization of methyl methacrylate monomers and possibly comonomers in at least two reactors operating in series, in which a high degree of mixing is ensured, characterized in that a) a first reactor is operated at a temperature of below 120° C. and b) a second or further subsequent reactors is or are operated in a temperature range of above 130° C. and at most 200° C.

It was completely unexpected that molding compounds with characteristics comparable in quality to those in European Patent 656374 would be obtained despite the relatively high temperatures from the second reactor stage on, since such temperatures theoretically should favor the formation of isotactic triads and thus tend to contribute to impairment of deflection temperature under load. Furthermore, a perceptible increase in degree of conversion is permitted because of the continuous operation of the process. It is also surprising that, from the second reactor stage on, it is possible optionally to proceed without addition of further polymerization initiator. It is conceivable that new polymerization-initiating compounds which become active in the second reaction stage are formed in the first reactor stage by an as yet unknown mechanism involving the feed polymerization initiators.

The process is performed in agitating reactors with high intermixing efficiency. The polymerization temperatures in the first reactor stage are below 120° C., preferably between 30 and 110° C., especially preferably between 60 and 100° C. Conversions up to about 40% are achieved in this stage. Preferably, the conversion relative to the feed monomers is 20–40% in the first stage. The reaction mixture is then transferred to the second or further reactors, where it is further polymerized. Addition of further polymerization initiator is optional. The polymerization temperatures in these further reactor stages are above 130° C. and up to 200° C. Polymerization temperatures of 130 to 180° C., and especially 140 to 160° C., are preferably used. In this way, up to 70% of the monomers in total are converted to polymethacrylate polymers. Preferably, the conversion is >40 to 70% in the second reactor. The polymethacrylate polymers preferably have a content of more than 80 wt % of methyl methacrylate, particularly preferably more than 95 wt % and especially more than 98 wt %. After the end of polymerization, unreacted monomers are preferably removed by devolatilization in an extruder, while the polymerized product is discharged at the same time. The separated monomers can be reused in the first reactor stage of the process. By means of the process according to the invention it is possible to synthesize, in high yields, polymethacrylate polymers which have excellent deflection temperature under load and high thermal stability.

PRACTICE OF THE INVENTION

The process according to the invention is preferably performed continuously by means of two reactors equipped with agitating assemblies. Examples of suitable agitating reactors include those equipped with paddle, anchor, disk or impeller agitators (in this regard see, for example, Kirk-Othmer, Encyclopedia of Chemical Technology, Vol. 19, pages 880 to 914, John Wiley & Sons, New York, 1982). Furthermore, continuous reactors such as flow tubes, in which the flow is preferably turbulent, or screw conveyor units, preferably twin screw extruders with a narrow residence time spectrum, can also be used. Agitating reactors in which the agitating units ensure a high degree of intermixing are preferably used. The unreacted monomers can be removed from the reaction mixture by vacuum devolatilization methods such as flash-devolatilization by intermittent application of a vacuum, by film evaporation or preferably by continuous devolatilization in an extruder with applied vacuum.

Polymethacrylate molding compounds according to the invention are defined as compounds whose structure comprises more than 80 wt % of methyl methacrylate, especially such with more than 95 wt % of methyl methacrylate and preferably such which contain 98 to 100 wt % of methyl methacrylate as the monomeric repeating unit. If necessary, comonomers such as acrylic acid esters, preferably with $C_1$–$C_8$-alkyl in the ester group, methacrylic acid esters, preferably with $C_2$–$C_8$-alkyl in the ether group, (meth) acrylonitrile, (meth)acrylic acid amides, styrene or substituted styrenes, vinyl esters or vinylamides, maleic acid or its derivatives and possibly still other copolymerizable monomers are also present (in this regard, see in particular H. Rauch-Puntigam, Th. Völker, Acryl- und Methacrylverbindungen (Acrylic and Methacrylic Compounds), Springer, Heidelberg, 1967).

The deflection temperature under load of commercial molding compounds can be characterized roughly by a Vicat softening temperature VST per ISO 306 Method B of about 108° C. Molding compounds with high deflection temperature under load are defined as such that have VST values of about 110° C., preferably >111° C., especially preferably >112° C. High thermal stability of the molding compounds is defined as a TD value of about 290° C., preferably >300° C. and especially 320° C. and above. The TD value is that temperature, measured in degrees Celsius, at which a polymer specimen that has been conditioned for a period of 16 hours at 140° C. exhibits 2% weight loss during a dynamic gravimetric measurement on a thermal balance under nitrogen atmosphere with a heating rate of 5 degrees per minute.

THE POLYMERIZATION PROCESS

The polymerization initiators used are those which are usual in themselves for radical polymerization of methacrylates, for example, azo compounds such as azodiisobutyronitrile, peroxides such as dibenzoyl peroxide or dilauryl peroxide, or other peroxide compounds such as t-butyl peroctanoate, or perketals, as well as redox initiators if appropriate (in this regard see, for example, H. Rauch-Puntigam, Th. Völker, Acryl- und Methacrylverbindungen (Acrylic and Methacrylic Compounds), Springer, Heidelberg, 1967, or Kirk-Othmer, Encyclopedia of Chemical Technology, Vol. 1, pages 286 ff., John Wiley & Sons, New York, 1978). The polymerization initiators are used preferably in proportions of $10^{-4}$ to 0.1 wt % relative to the starting materials, especially preferably in proportions of $2\times10^{-4}$ to 0.08 wt %, and quite especially preferably in proportions of $10^{-3}$ to 0.05 wt %.

Compounds that are usual in themselves, especially mercaptans of the R—SH type, wherein R can stand for an alkyl group with 2 to 20 carbon atoms, which may be cyclic or branched, are also used as molecular-weight or chain-transfer regulators. Examples of such compounds include n-butylmercaptan, dodecylmercaptan, esters of thiopropionic acid, esters of thioglycolic acid or even polyfunctional mercaptans with 2 to 6 SH groups. The molecular-weight regulators are preferably used in proportions of 0.05 to 5 wt % relative to the starting materials (in this regard see also H. Rauch-Puntigam, Th. Völker, Acryl- und Methacrylverbindungen (Acrylic and Methacrylic Compounds), Springer, Heidelberg, 1967). Especially preferred are proportions of molecular-weight regulators of 0.1 to 2 wt %, and quite especially preferred are proportions of 0.2 to 1 wt %. Furthermore, other compounds such as $CCl_4$ or benzyl bromide, for example, can be used for molecular-weight regulation.

Preferable regulators, however, are those of the R—SH or R'—H type, wherein R' can stand for alkyl, cycloalkyl or aralkyl with 5 to 30 carbon atoms, such as cumene, which are capable of terminating the growing polymer chain with an H atom. Particularly good molecular-weight regulators are, for example, dodecylmercaptan, methyl 3-mercaptopropionate or n-butylmercaptan.

By virtue of the interaction of initiator and polymerization regulator, the degree of polymerization of the produced homopolymerized or copolymerized product is determined in a manner known in itself. Industrial polymethacrylate molding compounds for extrusion, injection molding or film manufacture usually have molecular weights of 100,000 to 200,000 Dalton (weight-average) and viscosity numbers of about 45 to 80 ml/g, measured per ISO 1628-6 in chloroform at 25° C.

In the polymerization process according to the invention, there are used as starting materials the pure monomers or mixtures of monomers which can contain, in addition to the polymerization initiators and molecular-weight regulators, further additives such as mold-release agents, pigments or anti-turbidity agents in proportions of up to 10 wt %, preferably in proportions of up to 5 wt % relative to the feed monomers.

The reaction is preferably performed in the presence of high monomer concentrations without addition of solvents. Preferably the monomers are used in concentrations of about 4 to 5 mole per liter of reaction mixture. Agitating reactors with intensive intermixing are particularly suitable for the process according to the invention. The polymerization temperatures in the first reactor are below 120° C., preferably between 30 and 110° C. and especially preferably between 60 and 100° C. Methods which are usual in themselves for heat input into reactors are used for heating the reaction mixture to polymerization temperature, for example pressurized-steam heat exchangers and/or preferably the released enthalpy of polymerization. The duration of polymerization in the first reactor stage can be about 15 to 180 minutes. A polymerization time of about 120 minutes, for example, is favorable. Monomer conversions of up to 40% can be achieved during this period. The reaction mixture is then transferred to a second reactor and further polymerized therein. Surprisingly, it was found that addition of further polymerization to continue the polymerization is usually not necessary. However, it can be optimized. In the second or further reactor stages, the polymerization temperatures are higher than 130° C. and up to 200° C. Polymerization temperatures of 130 to 180° C., especially 140 to 160° C. are preferably used. In this way up to 70% in total of the original feed monomers is converted to polymethacrylate polymers. The ratio of the residence time of the reaction mixture in the first reactor to that in the second and further reactors in total is preferably at least 1.5 to 1. The duration of polymerization in the first reactor stage can be, for example, 15 to 180 minutes. The reaction can be stopped after a total polymerization time of 10 to 120 minutes in the second and further reactor stages. A two-stage process is particularly preferred.

Examples of how the polymerization reaction can be stopped are rapid removal of the unreacted monomer constituents by methods such as vacuum devolatilization in the reactor, film evaporation in a thin-film evaporator or devolatilizing extrusion of the reaction mixture.

After the reaction, the unreacted monomer constituents are removed in the way already described hereinabove. A preferred method is vacuum devolatilization, in which the unreacted monomer constituents are recovered and recycled to a new reaction. Particularly preferred is devolatilization of the reaction mixture by extrusion, preferably in a single or twin screw extruder with one or preferably several vacuum zones.

In a preferred embodiment of the invention, the reaction mixture comprising polymethacrylate polymerized product and unreacted monomers is discharged continuously from the last polymerization reactor after the end of the reaction and fed to a devolatilizing extruder, from which the unreacted monomer constituents are removed and, after condensation, can be recycled to the reaction. After passage through the devolatilization zone or zones, the devolatilized molding-compound melt is subjected to high pressure in a compression zone of the extruder and extruded in the form, for example, of a strand or strand bundle. The polymer strands are cooled to below softening temperature in standard manner and divided to obtain a commercial pelletized molding compound. In this connection, cooling can be applied before, during or after the dividing operation.

A further preferred embodiment is semicontinuous synthesis of the polymethacrylate molding compound by time-sequenced polymerization in a plurality of agitating reactors, in which case buffer tanks such as holding boilers are used particularly preferably in order to ensure continuous operation of the devolatilizing extruder.

In a particularly preferred embodiment, the polymerization is performed continuously in a two-stage polymerization-boiler cascade in such a way that the heat of reaction being released in the respective polymerization reactor is just sufficient to heat the monomer or monomer/polymer mixture being fed to the reactor to reaction temperature. In this embodiment, there is no need to input heat from or remove heat to the outside. This procedure not only is particularly economical from the energy viewpoint, but also it has been found that development of a coating by build-up of polymerized product on the reaction wall (fouling) does not occur.

For a two-stage polymerization program starting from methyl methacrylate or a monomeric mixture of methyl methacrylate and further comonomers with a temperature in the range of −20° C. to +20° C., this means, for example, that the first reactor is operated at 90° C. and a steady-state conversion on the order of 25 to 40%, while the second reactor is maintained, for example, at 150° C., with a steady-state conversion on the order of >40 to 70%.

ADVANTAGEOUS EFFECTS OF THE INVENTION

By means of the process according to the invention, it is possible to synthesize polymethacrylate molding compounds with high deflection temperature under loads, or in other words deflection temperature under loads of at least about 110° C., measured as the Vicat softening temperature per ISO 306 Method B. Preferably the polymethacrylate molding compounds obtained have Vicat softening temperatures of higher than 111° C., especially >112° C.

The high thermal stability of the polymethacrylate molding compounds with TD values of >290° C., preferably >300° C. and especially >320° C. prevents thermal decomposition of the molding compounds during thermoplastic processing. The molding compounds that can be synthesized by the process according to the invention are therefore used preferably where the requirements call for high processing stability, low residual monomer content in the finished molded article and if appropriate high transparency to light. Preferred areas of application are therefore lamp covers exposed to high temperatures, lenses for automobile tail and signal lights, and also the entire household sector.

What is claimed is:

1. A semi-continuous or continuous process for the synthesis of polymethacrylate molding compounds, comprising:

mixing a reaction mixture comprising a methyl methacrylate monomer, up to 0.08% by weight of a polymerization initiator, between 0.1 and 2% by weight of a molecular-weight regulator per 100% by weight of said reaction mixture, and optionally a comonomer; and radical polymerizing of said reaction mixture in at least two reactors operating in series, thereby providing a polymerized reaction mixture comprising said polymethacrylate and an unreacted monomer;

wherein
  a) a first reactor is operated at a temperature of below 120° C.;
  b) a second or subsequent reactors is operated in a temperature range of between 130° C. and 200° C.;
  c) said unreacted monomer is separated by vacuum devolatilization in a subsequent separation step;

wherein said unreacted monomer is recycled at least in part to said reaction mixture in said first reactor;

wherein said first reactor and at least said second reactor are agitating reactors equipped with agitating units to ensure intermixing of said reaction mixture;

wherein said polymethacrylate molding compound is obtained from more than 80% by weight of said methyl methacrylate monomer per 100% by weight of said polymethacrylate molding compound; and wherein said polymethacrylate molding compound has a Vicat softening temperature per ISO 306 Method B of about 110° C., and a TD value of about 290° C.

2. The process according to claim 1, wherein said first reactor is operated in a temperature range of 30 to 110° C.

3. The process according to claim 1, wherein said first reactor is operated in a temperature range of 60 to 100° C.

4. The process according to claim 1, wherein said second or subsequent reactor is operated in a temperature range of 130 to 180° C.

5. The process according to claim 1, wherein said second or subsequent reactors is operated in a temperature range of 140 to 160° C.

6. The process according to claim 1, wherein said polymethacrylate molding compound is obtained from more than 95% by weight of methyl methacrylate monomers per 100% by weight of said polymethacrylate molding compound.

7. The process according to claim 1, wherein said polymerizing proceeds without additional energy input or cooling.

8. The process according to claim 1, wherein a ratio of a residence time of said reaction mixture in said first reactor to a residence time in said second and subsequent reactors is at least 1.5 to 1.

9. The process according to claim 1, wherein two reactors are used.

10. The process according to claim 9, wherein the conversion relative to the feed monomers is 20 to 40% in said first reactor and >40 to 70% in said second reactor.

11. A semi-continuous or continuous process for the synthesis of polymethacrylate molding compounds, comprising:

mixing a reaction mixture comprising a methyl methacrylate monomer, up to 0.08% by weight of a polymerization initiator, between 0.1 and 2% by weight of a molecular-weight regulator per 100% by weight of said reaction mixture, and optionally a comonomer; and radical polymerizing of said reaction mixture in at least two reactors operating in series, thereby providing a polymerized reaction mixture comprising said polymethacrylate and an unreacted monomer;

wherein
a) a first reactor is operated at a temperature of below 120° C.;
b) a second or subsequent reactors is operated in a temperature range of between 130° C. and 200° C. and no additional polymerization initiator is added;
c) said unreacted monomer is separated by vacuum devolatilization in a subsequent separation step;

wherein said unreacted monomer is recycled at least in part to said reaction mixture in said first reactor;

wherein said first reactor and at least said second reactor are agitating reactors equipped with agitating units to ensure intermixing of said reaction mixture;

wherein said polymethacrylate molding compound is obtained from more than 80% by weight of said methyl methacrylate monomer per 100% by weight of said polymethacrylate molding compound; and wherein said polymethacrylate molding compound has a Vicat softening temperature per ISO 306 Method B of >111° C., and a TD value of >300° C.

12. The process according to claim 11, wherein said first reactor is operated in a temperature range of 30 to 110° C.

13. The process according to claim 11, wherein said first reactor is operated in a temperature range of 60 to 100° C.

14. The process according to claim 11, wherein said second or subsequent reactor is operated in a temperature range of 130 to 180° C.

15. The process according to claim 11, wherein said second or subsequent reactors is operated in a temperature range of 140 to 160° C.

16. The process according to claim 11, wherein said polymethacrylate molding compound is obtained from more than 95% by weight of methyl methacrylate monomers per 100% by weight of said polymethacrylate molding compound.

17. The process according to claim 11, wherein said polymerizing proceeds without additional energy input or cooling.

18. The process according to claim 11, wherein a ratio of a residence time of said reaction mixture in said first reactor to a residence time in said second and subsequent reactors is at least 1.5 to 1.

19. The process according to claim 11, wherein two reactors are used.

20. The process according to claim 19, wherein the conversion relative to the feed monomers is 20 to 40% in said first reactor and >40 to 70% in said second reactor.

* * * * *

UNITED STATES PATENT AND TRADEMARK OFFICE
CERTIFICATE OF CORRECTION

PATENT NO.     : 6,214,942 B1                                              Page 1 of 1
DATED          : April 10, 2001
INVENTOR(S)    : Werner Siol et al.

It is certified that error appears in the above-identified patent and that said Letters Patent is hereby corrected as shown below:

Column 2,
Line 48, "polyarcrylate" should read -- polymethacrylate --.

Column 3,
Line 4, "percentage elongation under load" should read -- elongation at break --;
Line 12, "largely" should read -- nearly --;
Line 24, "16520 C" should read -- 165 °C --.

Column 5,
Line 14, "ether" should read -- ester --.

Column 6,
Line 50, "polymerization to" should read -- polymerization initiator to --.

Column 7,
Line 25, "dividing" should read -- granulation --;
Line 34, "polymerization-boiler" should read -- polymerization reactor --;
Lines 38 and 39, "input heat from or remove heat or remove heat to the outside" should read -- to supply further heat or to draw off heat from the reactor. --
Line 40, "energy viewpoint" should read -- energetical point of view --;
Line 42, "reaction" should read -- reactor --;
Line 44, "program" should read -- process --.

Signed and Sealed this

Second Day of July, 2002

*Attest:*

*Attesting Officer*

JAMES E. ROGAN
*Director of the United States Patent and Trademark Office*